United States Patent [19]
> 
> Taylor
> 
> [11] 4,150,819
> [45] Apr. 24, 1979

[54] RECOIL-COUNTER-RECOIL SYSTEM

[75] Inventor: Douglas P. Taylor, N. Tonawanda, N.Y.

[73] Assignee: Tayco Developments, Inc., North Tonawanda, N.Y.

[21] Appl. No.: 844,922

[22] Filed: Oct. 25, 1977

[51] Int. Cl.² .......................... F16F 9/32; F16F 19/02
[52] U.S. Cl. ................................... 267/136; 89/43 R; 188/1 C; 267/22 R
[58] Field of Search .................. 89/42 R, 43 R, 44 R; 188/1 B, 1 C; 267/22 R, 64 B, 126, 136, 137

[56]  References Cited
U.S. PATENT DOCUMENTS

| | | | |
|---|---|---|---|
| 1,273,059 | 7/1918 | Hild | 267/126 X |
| 2,691,518 | 10/1954 | Smith | 267/126 |
| 3,228,492 | 1/1966 | Blumrich | 188/1 C |
| 3,298,465 | 1/1967 | Stastny | 188/1 C |
| 3,418,880 | 12/1968 | Herlach | 89/42 |

Primary Examiner—Duane A. Reger
Attorney, Agent, or Firm—Joseph P. Gastel

[57] ABSTRACT

A recoil-counter-recoil energy absorber unit including an outer housing for guiding a recoiling mass, an hydraulic energy absorber unit mounted between a portion of the housing and the mass, a recoil spring mounted between the energy absorber unit and the housing, a second housing mounting the hydraulic energy absorber unit and for permitting it to move unrestrictedly in a recoil direction but resisting movement thereof in a counter-recoil direction, whereby the second housing will be stretched after the hydraulic energy absorber moves beyond a predetermined counter-recoil position to thereby absorb counter-recoil energy as a result of being stretched. Included in the hydraulic energy absorber is an improved bottoming stop and combined bottoming energy absorber, guidance member, and accumulator retainer which consists of an annular channel member having an inner portion slidably mounted on the piston rod of the hydraulic energy absorber and has a second portion slidably supporting the cylinder of the hydraulic energy absorber, with a movable bottom closure mounted on the cylinder for compressing the annular channel member when the hydraulic cylinder bottoms against a fixed stop attached to the outer housing.

25 Claims, 17 Drawing Figures

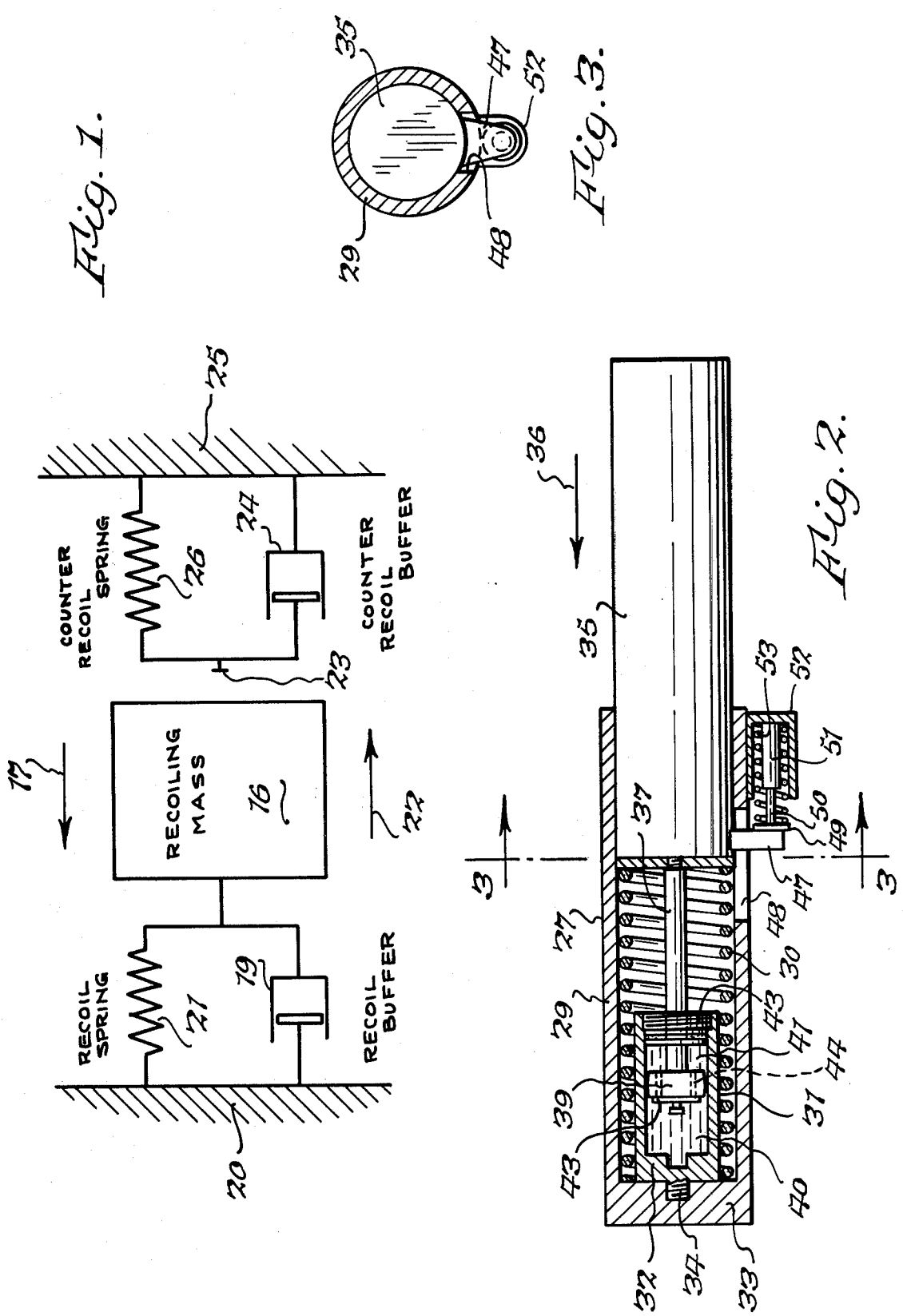

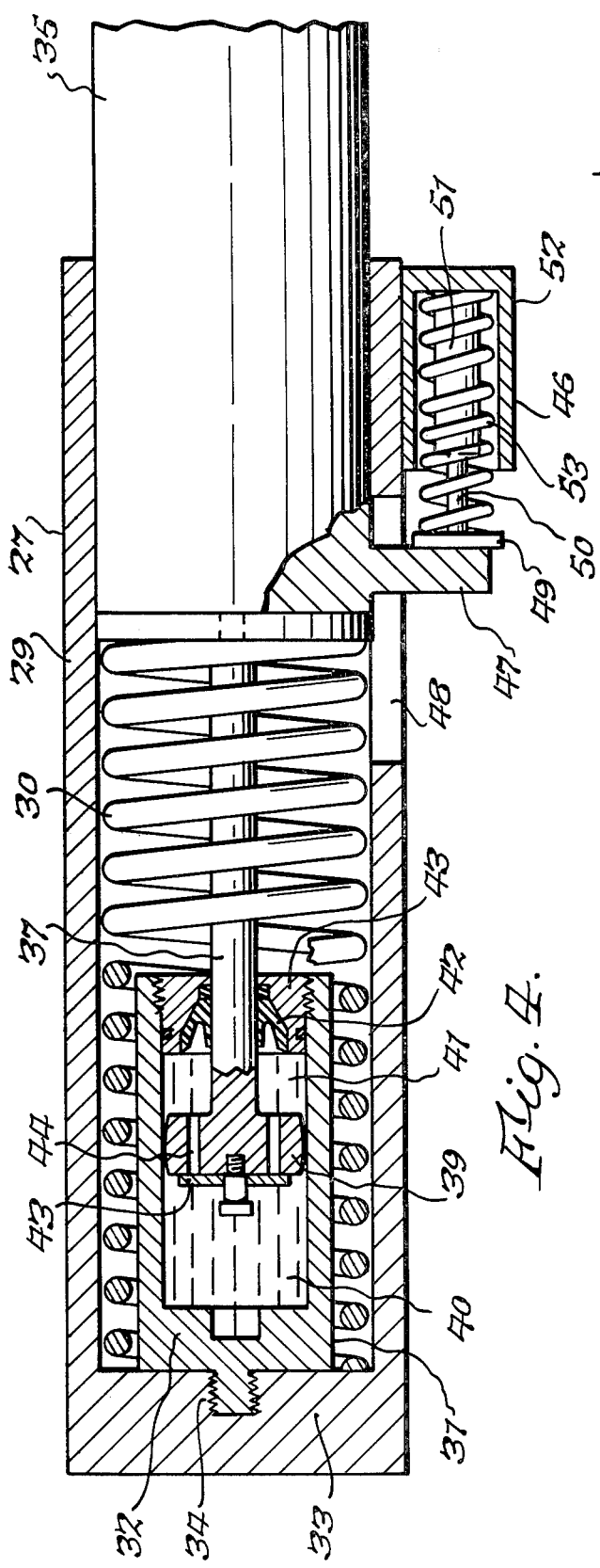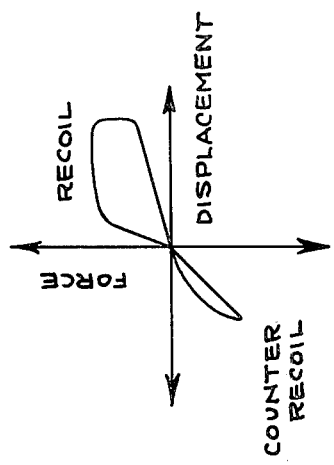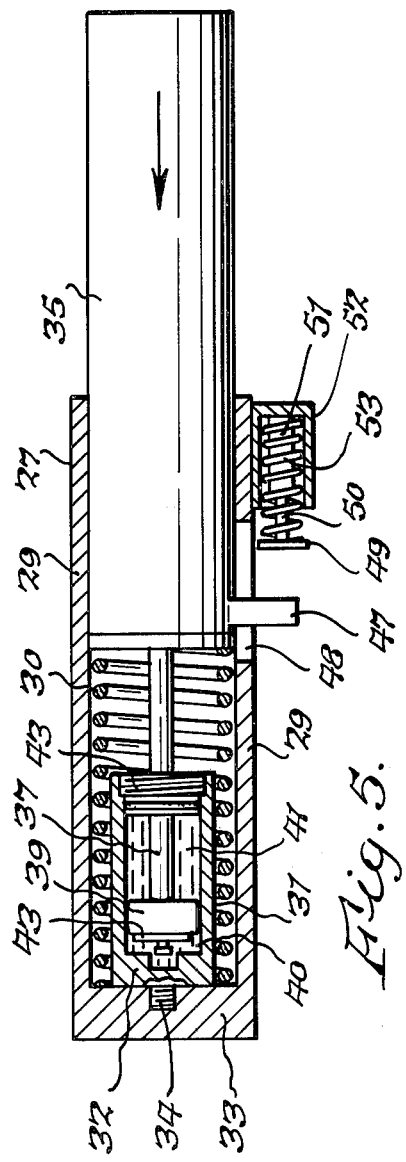

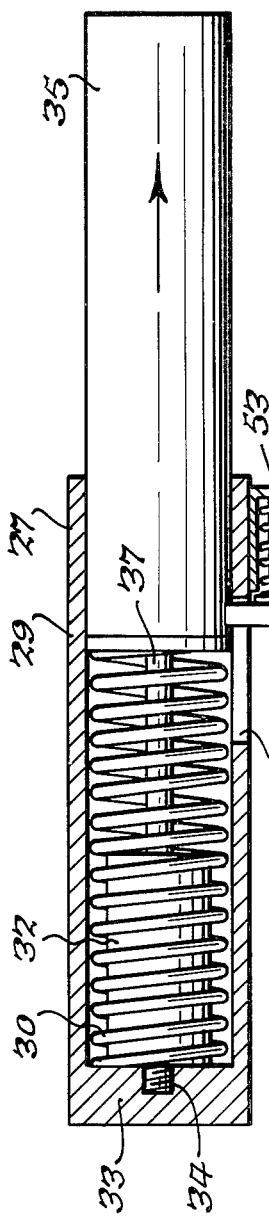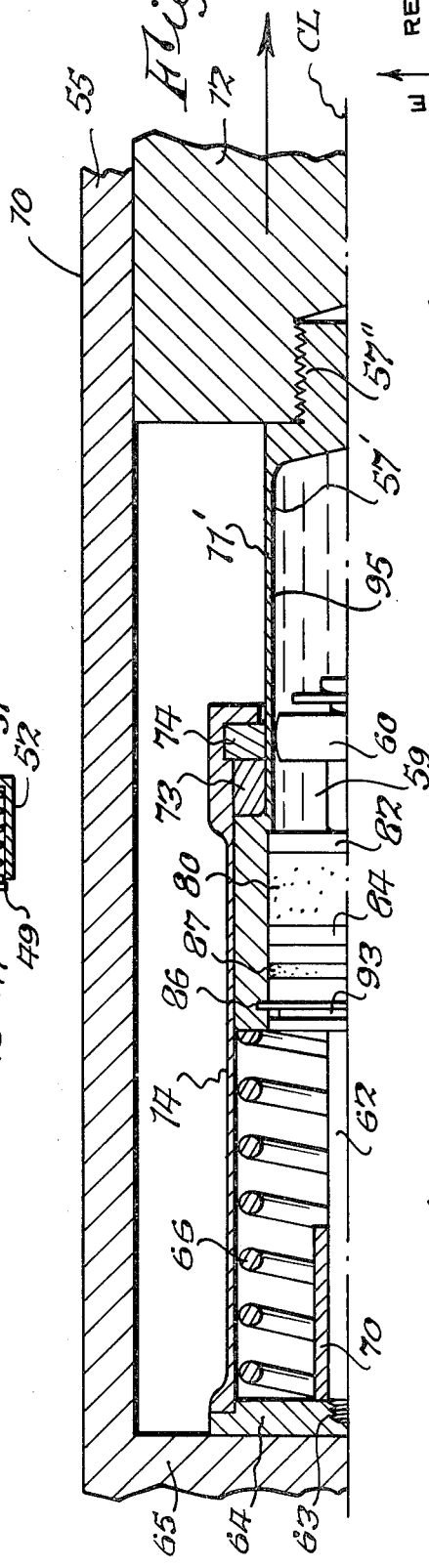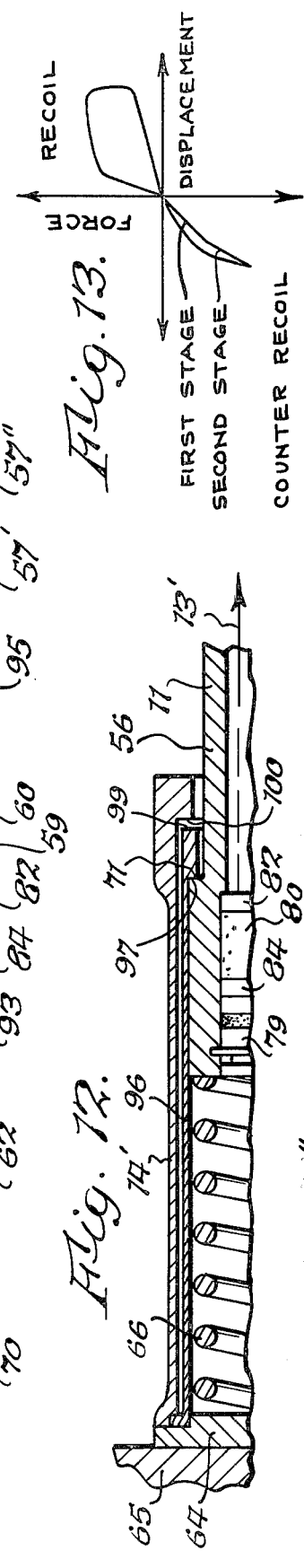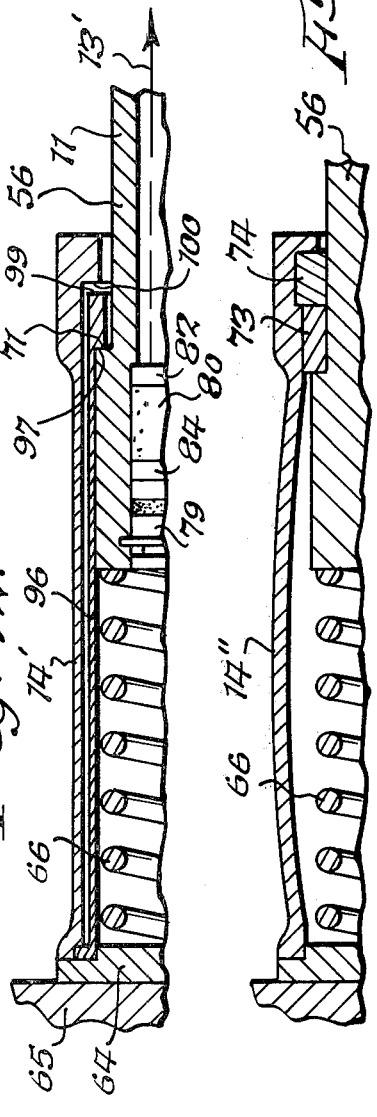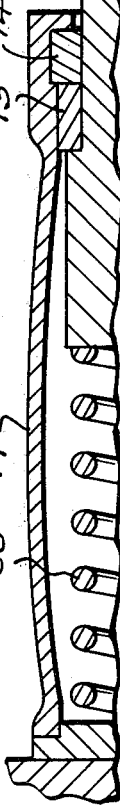

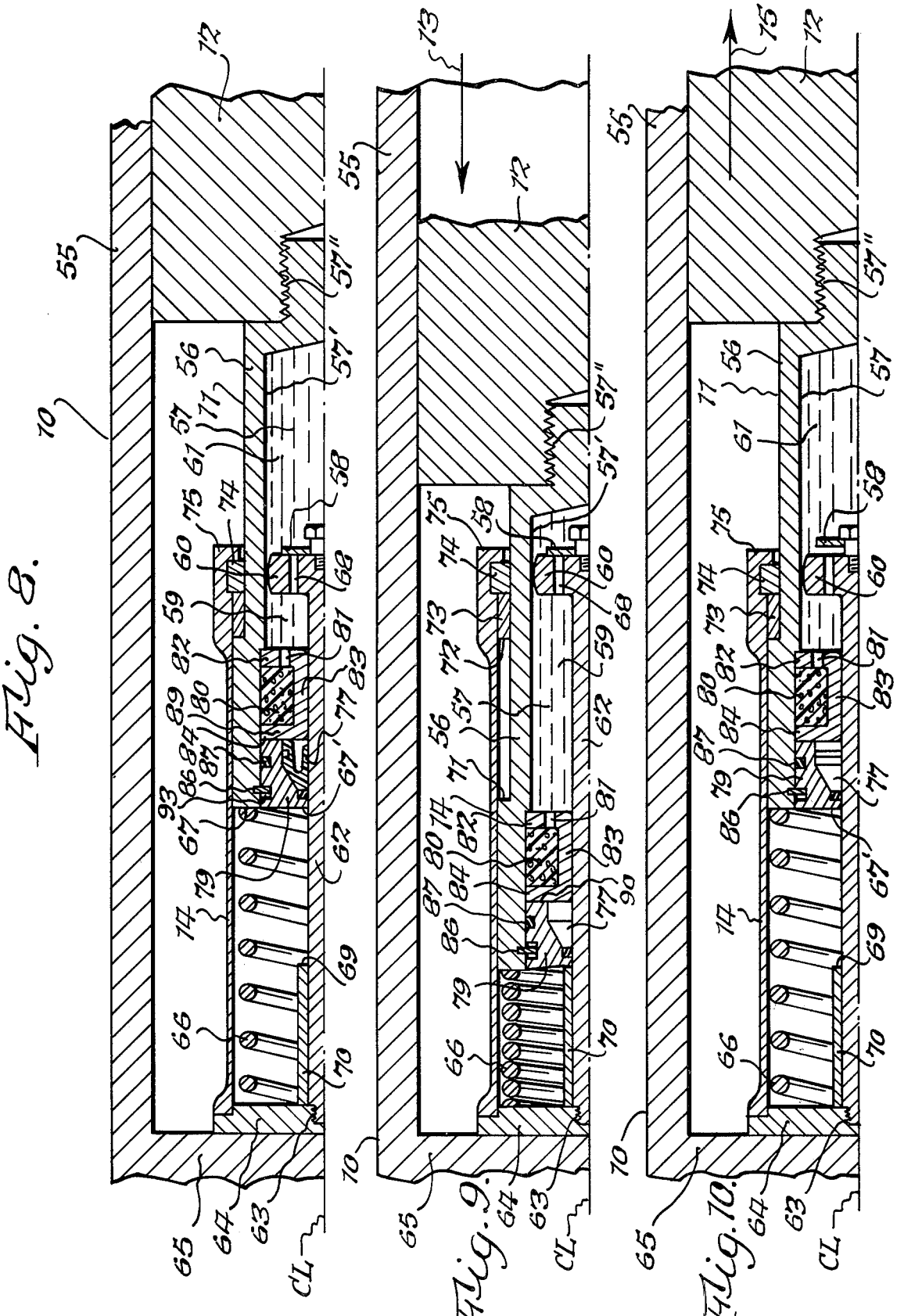

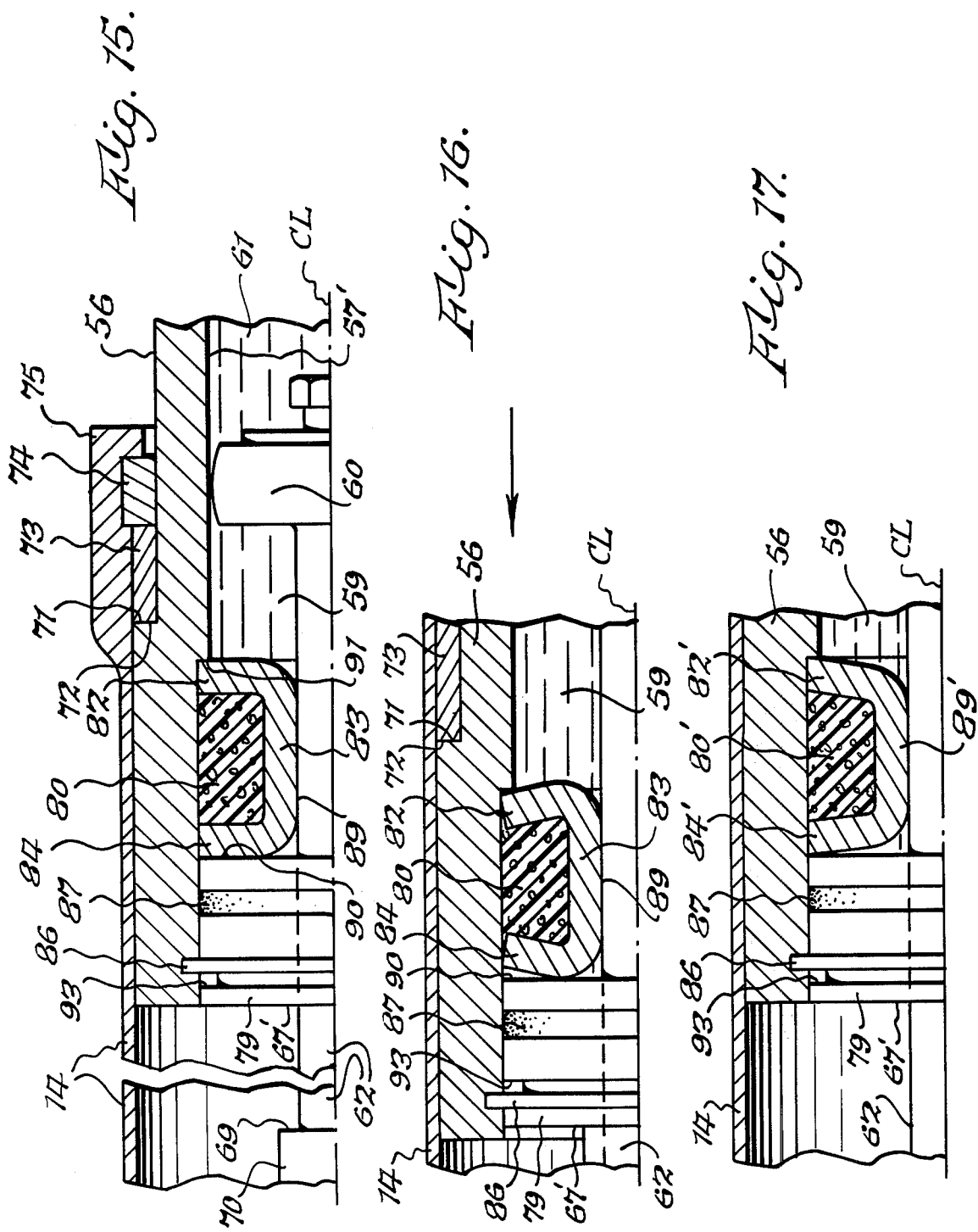

RECOIL-COUNTER-RECOIL SYSTEM

BACKGROUND OF THE INVENTION

The present invention relates to an improved recoil-counter-recoil energy absorption system and an improved combined accumulator retainer, bottoming member construction, and guidance member therefor.

By way of background, recoil-counter-recoil energy absorber units are used in environments wherein a large amount of energy of a recoiling mass must be absorbed and the mass must be reset to a neutral position quickly. Environments in which the foregoing type of constructions are used is in large guns, such as naval guns and howitzers, and in other analogous applications.

In the past recoil-counter-recoil energy absorbers were relatively large in size and cumbersome in that they utilized a first energy absorber to absorb the energy of the recoiling mass, and a second energy absorber located in opposition to the first energy absorber for absorbing the counter-recoil energy. These prior designs utilizing two separate energy absorbers were costly, cumbersome and difficult to package effectively. Furthermore, they occupied a relatively large amount of space.

SUMMARY OF THE INVENTION

In accordance with the present invention, an improved energy absorption system is provided for recoil-counter-recoil applications by utilizing an hydraulic energy absorber encased in a protective guide sleeve or housing which is so constructed and installed so as to be stretched during counter-recoil so as to absorb the counter-recoil energy. Thus, there is provided a single unit for providing recoil-counter-recoil energy absorption, rather than the two units previously used.

It is accordingly one important object of the present invention to provide an improved recoil-counter-recoil energy absorption system which is extremely compact in that both the recoil energy absorber and the counter-recoil energy absorber are packaged into a single unit.

Another object of the present invention is to provide an improved recoil-counter-recoil energy absorber unit which is capable of providing variable degrees of counter-recoil energy absorption by permitting varying construction parameters of the housing which forms a part of the unit.

A further object of the present invention is to provide a counter-recoil energy absorber unit which acts as a guidance member for the recoil energy absorber unit inasmuch as it is peripherally disposed about the recoil energy absorbing cylinder.

Yet another object of the present invention is to provide an improved energy absorber unit having an improved internal guide member to provide guidance in both the recoil and counter-recoil modes of operation.

Still another object of the present invention is to provide an improved combined accumulator retainer, bottoming member, and guidance member for use with an hydraulic energy absorber cylinder. Other objects and attendant advantages of the present invention will readily be perceived hereafter.

The present invention relates to a recoil-counter-recoil system for absorbing energy of a body moving in first and second opposite directions during recoil and counter-recoil, respectively, comprising first energy absorber means for absorbing the recoil energy of said body during movement of said body in said first direction, and second energy absorber means stretchable in said second direction for absorbing the energy of counter-recoil of said body as a result of being stretched by movement of said body in said second direction.

The present invention also relates to an energy absorber for absorbing energy comprising a first cylinder for containing hydraulic fluid, a piston in said cylinder, a base member, a piston rod having first and second end portions, means mounting said first end portion on said base member, means mounting said piston on said second end portion, an end closure on said cylinder between said first and second end portions, a first surface on said end closure facing said base member, a second surface on said end closure facing said piston, means mounting said end closure for movement relative to said cylinder in a direction axially of said piston rod, energy absorbing bottoming stop means comprising means for engaging said first surface to cause said end closure to travel toward said piston, a third surface on said cylinder between said bottoming stop means and said piston, and yieldable means for being engaged between said second surface and said third surface within said cylinder for absorbing bottoming impact. In its more specific aspect, the energy absorbing bottoming stop means includes structure for guiding said piston rod and for mounting an hydraulic fluid accumulator.

The various aspects of the present invention will be more fully understood when the following portions of the specification are read in conjunction with the accompanying drawings wherein:

BRIEF DESCRIPTION OF THE DRAWINGS

FIG. 1 is a systems diagram of a conventional recoil-counter-recoil mass interaction device using a first energy absorber for recoil and a second energy absorber for counter-recoil, with the second energy absorber being offset from the first energy absorber;

FIG. 2 is a view, partially in cross section, of a conventional type of recoil-counter-recoil mass interaction system using two separate energy absorption means, one for recoil and one for counter-recoil;

FIG. 3 is a cross sectional view taken substantially along line 3—3 of FIG. 2;

FIG. 4 is an enlarged view of FIG. 2 with additional parts being broken away;

FIG. 5 is a view similar to FIG. 2 but showing the positions of the various parts in the full recoil position;

FIG. 6 is a view similar to FIGS. 2 and 5 but showing the system in the full counter-recoil position;

FIG. 7 is a force-displacement output curve of the system of FIG. 2 showing the forces and displacements during recoil and counter-recoil;

FIG. 8 is a fragmentary cross sectional view of the improved recoil-counter-recoil system of the present invention wherein an hydraulic energy absorber for absorbing recoil energy is positioned within a sleeve which constitutes a stretchable energy absorber for absorbing counter-recoil energy, with the energy absorber including a combined guidance member, bottoming stop, and accumulator;

FIG. 9 is a view of the system of FIG. 8 but showing the parts in full recoil position;

FIG. 10 is a view of the system of FIG. 8 but showing the parts in full counter-recoil position;

FIG. 11 is a fragmentary view of a modification of the system of FIG. 8 which also includes a counter-recoil energy storing housing for the hydraulic recoil energy absorber in addition to the counter-recoil energy absorber sleeve of the system of FIG. 8;

FIG. 12 is a fragmentary cross sectional view of a further modification of the system of FIG. 8 which includes a pair of sleeves for providing a two-stage energy absorber action during counter-recoil;

FIG. 13 is a force-displacement diagram for the system of FIG. 12 and showing the recoil curve and the two-stage counter-recoil curve;

FIG. 14 is a fragmentary cross sectional view of a further modified form of the present invention utilizing a recoil sleeve having a convex wall to produce a variable rate output during counter-recoil energy absorption;

FIG. 15 is an enlarged fragmentary view of the guidance member portion of FIG. 8 and showing especially the elastic accumulator member for absorbing additional recoil energy to further guard against damage due to a bottoming overload;

FIG. 16 is a fragmentary view showing the subject matter of FIG. 15 in the full recoil position; and FIG. 17 is a modification of the accumulator of FIG. 15 in which the walls of the accumulator spool have been prestressed outwardly for greater absorption of bottoming energy.

DETAILED DESCRIPTION OF THE INVENTION

Summarizing briefly in advance and referring to FIGS. 8, 9 and 10, the improved recoil-counter-recoil system 10 of the present invention combines recoil and counter-recoil buffers into a single unit wherein recoil energy is absorbed by the action of an hydraulic energy absorber 11 as the mass 12 moves in the direction 13 from the position of FIG. 8 to the position of FIG. 9, and wherein counter-recoil energy is absorbed by the stretching of housing 14 as the mass 12 moves in the direction of arrow 15 to the position shown in FIG. 10. Thus, as described above, a single unit consisting of energy absorbers 11 and 14 is utilized to absorb both recoil and counter-recoil energy.

For a fuller understanding of the recoil-counter-recoil system of the present invention, reference is now made to FIGS. 1-7. FIG. 1 depicts a basic recoil-counter-recoil system (hereinafter referred to as a RCR system) and FIGS. 2-7 depict the conventional prior art. In FIG. 1 a systems diagram shows a recoiling mass 16 which will recoil in the direction of arrow 17. This mass may be an item such as a howitzer, naval gun, or the like, or it may be any other type of large mass having a tremendously large recoil energy. The recoiling mass moving in the direction of arrow 17 has its energy absorbed by recoil buffer 19 which is suitably anchored to a base 20. In order to reset the recoil mass to a neutral position from its extreme left position in FIG. 1, a recoil spring 21, which is compressed during recoil, moves it in the direction of arrow 22 whereupon the recoil mass will engage member 23 which transmits the counter-recoil energy produced by spring 21 to counter-recoil buffer 24 which is anchored to base 25. Thereafter, the counter-recoil spring 26, which is compressed during counter-recoil, will move the mass 16 in the direction of arrow 17 to a neutral position.

A conventional RCR system 27 (FIGS. 2-7) includes a housing 29 containing a recoil spring 30 which encircles a liquid energy absorber unit 31 having an end portion 32 seated on housing end wall 33 and secured thereto by a threaded connection 34 therebetween. The hydraulic energy absorber unit 31 may be of a conventional type wherein the energy of the mass 35 moving in the direction 36 is transmitted to energy absorber 31 through piston rod 37 coupled to piston 39 which moves to the left causing the liquid in chamber 40 to be forced into chamber 41 by moving around piston 39. In this respect, at this time orifices 44 in piston 39 are closed because valve 43 is forced to the closed position shown in FIG. 4. The energy of mass 35 moving to the left is thus converted to heat. In addition, spring 30 will be compressed from the condition shown in FIGS. 2 and 4 to the condition shown in FIG. 5. A comparison of FIGS. 2 and 5 shows the relative sizes of chambers 40 and 41 on opposite sides of piston 39 before and after recoil, respectively. Energy absorber 31 includes a suitable seal construction 42 mounted in end wall 43 to prevent loss of liquid from unit 31.

After the energy of recoil has been absorbed, mass 35 is caused to move from the position of FIG. 5 to the full counter-recoil position shown in FIG. 6 because of the expansion of spring 30. During movement of piston 39 to the right, valve 43 (FIG. 4) is unseated from ports 44 to permit free transfer of fluid from chamber 41 to chamber 40. The unrestricted energy of mass 35 moving to the right will be absorbed by counter-recoil energy absorber 46. In this respect, a tab 47 is attached to mass 35, and this tab, which rides in slot 48 of housing 29, engages plate 49 which is connected to piston rod 50 which forms a part of an energy absorber unit 51 which may be identical in construction to energy absorber unit 31, but of smaller capacity. A housing 52 carries unit 51 and spring 53 which encircles it. After the energy of counter-recoil is absorbed, spring 53, which is compressed during counter-recoil, will expand to return the mass 35 to the position shown in FIGS. 2 and 4. The force-displacement curve of the system of FIGS. 2-7 is shown in FIG. 7 and it is believed to be self-explanatory.

It will be seen that the system of FIGS. 2-6 requires two energy absorber units of the hydraulic type located in opposition to each other but out of line with each other, which consumes extra space.

As noted briefly above, in accordance with the present invention, the housing 14 (FIG. 8) is utilized as a counter-recoil energy absorber. In this respect, it is the elasticity of housing 14 which is utilized for this purpose.

By way of background, it is basic that all materials are elastic, as is the case with the metal housing 14. As is well known, the relative amount of stretchability or flexure of a material is defined by its "modulus of elasticity". The modulus of elasticity is quantitatively defined as:

(1) $\text{Modulus of elasticity} = \frac{\text{Units Stress}}{\text{Units Strain}} = \frac{\sigma}{\epsilon}$ In equation (1), stress is defined as the unit material loading (usually pounds per square inch), and unit strain is defined as the stretch per linear inch of material involved (usually measured in inches-/inch).

(2) Using equation (1) and solving algebraically for unit stress yields $\sigma = E \times \epsilon$. Since unit stress is defined as load per unit area, we could define the total load on a part as the unit stress integrated over the entire area of the part, or:

(3) $\text{Load} = \int \text{Unit Stress} \, dA = \text{Unit Stress} \times A = \sigma \times A$.

Substituting equation (2) into equation (3) yields:

(4) Load = E × ε × A

Since unit strain is defined as a relative change in length, we can substitute $\Delta L/L$ in equation (4) for unit strain (ε), which is a change in length divided by length, and this results in:

(5) $\text{Load} = \dfrac{E \times \Delta L \times A}{L}$

Defining K, a spring coefficient as $$K = \dfrac{\text{load}}{\Delta L} \text{ or load} = K \times \Delta L$$

and substituting this into equation (5) yields:

(6) $K \times \Delta L = \dfrac{E \times \Delta L \times A}{L}$

Simplifying equation (6) and solving for K yields:

(7) $K = \dfrac{AE}{L} = \dfrac{\text{Area} \times \text{Modulus of Elasticity}}{\text{Length}}$ This equation defines K, the structural spring rate for a system. At this point the energy under a spring rate curve can be defined as the integral of the spring force over distance and this results in:

(8) Energy = $\int K L \, dL$

Equation (8), after integration, results in:

(9) $\text{Energy} = \dfrac{K \times L^2}{2}$

The foregoing means that if the structural spring rate developed in equation (7) is placed into equation (9), it is possible to calculate how much energy will be absorbed into a structure as it is loaded because when the value of K from equation (7) is substituted for K in equation (9) we have

(10) $\text{Energy} = \dfrac{\text{Area of Modulus Elasticity}}{\text{Length}} \times \dfrac{\text{Length}^2}{2} = \dfrac{\text{Area} \times \text{Modulus of Elasticity} \times \text{Length}}{2}$ It is equation (10) which is utilized to calculate the structural spring rate of the housing 14 of FIG. 8 to provide counter-recoil capacity for the energy absorber unit.

As noted briefly above, in most artillery weapons and various other heavy-duty high speed energy absorbing relationships, a recoil buffer or energy absorber is used to dissipate a large portion of the recoil energy into the environment as heat. As noted above, the recoil energy absorber is used in conjunction with a spring device to store some of the recoil energy to reset the recoiling mass to its original position. This reset operation must be performed quickly if the device is a weapon which has a predetermined high design rate of repeating a cycle. Because of this, the recoiling mass is usually reset quite quickly, and as noted above, a second energy absorber unit known as a counter-recoil buffer absorbs the energy of the recoiling mass as it reaches its terminal position. As noted above, the present invention is concerned with combining the separate recoil and counter-recoil energy absorber units into a single unit using the above teaching of structural spring rates of a paticular material.

The improved RCR unit 10 of FIGS. 8, 9 and 10 includes an outer housing 55 which guides the recoiling mass 12 in the direction of arrows 13 and 15. At this point it is to be noted that FIGS. 8, 9, 10, 11, 15, 16 and 17 are drawn on centerlines CL so as to avoid the necessity of drawing the full cross section of each item depicted in these figures, it being understood that the portion not shown on the opposite side of the centerline is the mirror image of that which is shown. The mass 12 is threaded to energy absorber cylinder 56 at 57" so that they both move as a unit. Cylinder 56 comprises a housing for hydraulic fluid 57 and this housing is divided into chamber 59 to the left of piston 60 and chamber 61 to the right thereof. Piston 60 in turn is mounted on piston rod 62 which is threaded at 63 into base 64 mounted on end wall 65 of housing 55. A recoil spring 66 is installed between the end 67 of housing 56 and plate 64. A counter-recoil energy absorber housing 14 encircles housing 56, and the two, which are cylindrical, are coaxial. During recoil, mass 12 and housing 56, attached thereto, will move in the direction of arrow 13 to the position of FIG. 9. During this movement, hydraulic liquid from chamber 61 will be transferred to chamber 59 with the resistance to such movement being dissipated into heat as the fluid travels around piston 60, to thereby absorb energy. Furthermore, recoil spring 66 will be compressed. The movement will continue until end plate 79 bottoms on the annular edge 69 of sleeve 70 which encircles piston rod 62. Thereafter, spring 66 will expand from the position shown in FIG. 9 to the position shown in FIG. 10 and in so doing will drive housing 56 to the right until annular shoulder 71 on housing 56 engages annular surface 72 on ring 73 which is held against movement to the right by means of annular key 74 mounted in the end portion 75 of housing 14. The engagement between shoulder 71 and edge 72 will cause housing 14 to be stretched during continued movement of mass 12 in the direction of arrow 15, and it is this stretching, when confined below the yield point of housing 14 which acts to absorb the energy of counter-recoil. After the energy is absorbed, the elasticity of housing 14 will cause it to return to its normal unstretched state preparatory to again absorbing counter-recoil energy, and such movement will be opposed by energy absorber 11. The action of valve 58 relative to ports 68 is the same as noted above relative to ports 44 and valve 43. At this point it is to be again noted that the counter-recoil housing or sleeve 14, which may be manufactured from any suitable material, has a spring rate which is determined by the housing's thickness, length and elastic constant, as described above.

In addition, the internal arrangement of the recoil energy absorber unit 11 (FIGS. 8, 9, 10 and 15) includes a seal 77, a combined end closure and bottoming stop 79, a linearly arranged combination accumulator retainer, bottoming member and guidance member 89, and a cellular accumulator 80 which communicates with chamber 59 through ports, such as 81 in flange 82. At this point it is to be noted that member 89 essentially comprises an annular channel having a central portion 83 for receiving piston rod 62 with a sliding fit to act as a guide, and it also includes in addition to end flange 82, an end flange 84. It is also to be noted that there is a slidable fit between the inside 57' of cylinder 56 and the outer portions of flanges 82 and 84. When the energy absorber housing 56 reaches the position of FIG. 9, as expressed above, it is portion 67' of bottoming stop 79 which engages the end 69 of sleeve 70. This will cause member 79 to move within housing 56 from the position shown in FIG. 8 to the position shown in FIG. 9. The limits of travel of member 79 are determined by annular key 86 secured in housing 56. In this respect, as can be seen from FIG. 8, key 86, which is received in annular slot 93, prevents member 79 from being pushed out of housing 56 to the left but permits member 79 to move to the position of FIG. 9 in the full recoil position. An annular seal 87 prevents leakage. Between member 79 and housing 56 there is an additional seal 77, noted above, which prevents leakage between piston rod 62 and member 69.

When bottoming member 79 is in the full recoil position, the flanges 82 and 84 of member 89 will be compressed toward each other, as shown in FIG. 16, because flange 84 is abutted by shoulder 90 (FIG. 9) of member 79 and flange 82 is abutted by shoulder 91 of housing 56. The tendency to force flanges 84 and 82 toward each other will absorb a certain amount of energy, thereby tending to cushion the shock of impact in the bottoming position.

At this point it is to be noted that in previous shock absorber designs, a separate accumulator chamber is provided to compensate for the displacement of piston rod 62 entering the housing or fluid chamber 56 during operation. In addition, various means are provided to prevent side loading on piston rod 62 due to misalignment and offset loading. The unique arrangement of end closure member 79 and the combining of an accumulator retainer, bottoming member and guidance member into member 89 allows for greatly decreased manufacturing costs. The linear arrangement of members 79 and 89 allows the members 79 and 89 to function as a noise deadening cushion when the energy absorber unit is bottomed in full compression. By making members 79 and 89 out of structural plastic or rubber, a bottoming impact will cause them to compress, thereby absoring noise energy. Furthermore, as noted above, foam 80 will act as an accumulator, and such foam is retained within the annular channel defined in member 89. At this point it is to be again noted that the configuration which member 89 assumes at full bottoming is shown in FIG. 16.

In FIG. 17 a modified embodiment of member 89, which is designated 89', is shown. The difference between the two is that the flanges 82' and 84' are both flared outwardly to allow greater deflection and thus greater energy absorbing capacity.

In FIG. 11 a modified embodiment of the present invention is shown wherein the recoil energy absorber unit 11', which is analogous to member 11 of FIG. 8, incudes a stretchable housing 95 which also functions as a counter-recoil energy absorber. Thus, the embodiment of FIG. 11 has energy absorbing capacity due both to the stretching of housing 14 and housing 95. In an embodiment such as shown in FIG. 11, it can be demonstrated that the total structural spring rate of the sleeve 14 and the sleeve of the cylinder assembly 11' is:

$$K \text{ (total)} = \frac{K_1 \times K_2}{K_1 + K_2}$$

This useful relationship permits a much softer total spring rate to result. For example, if the spring rate of sleeve 14 was 40,000 pounds per inch and the spring rate of cylinder wall 11' was 60,000 pounds per inch, then by substituting these values into the above equation, the total spring rate K would be 24,000 pounds per inch.

The significantly lower spring rate would allow a softer stop by the counter-recoil structural spring. Aside from the foregoing modification, the structure of FIG. 11 is identical to that of FIG. 8.

In FIG. 12 there is shown a further modification of the system of FIG. 8. In this modification the counter-recoil energy is absorbed by coaxial sleeves 14' and 96 acting in sequence. In this respect, as the mass attached to housing 11 moves in the direction of arrow 13', shoulder 71 of housing 11 will first engage shoulder 97 at the end of housing 96 to thereby stretch housing 96 to absorb counter-recoil energy. As housing 96 is stretched in the direction of arrow 13', end 99 thereon will abut shoulder 100 and continued movement of member 11 in the direction of arrow 13' will result in the stretching of housing 14' in addition to the stretching of housing 96 to provide a second stage of energy absorption which is a combined spring rate which is the sum of the spring rates of housings 14' and 96, and this is shown diagrammatically in FIG. 13. Thus, the springs 14' and 96 are stretched in sequence and cumulatively.

In FIG. 14 a still further modified form of the present invention is shown wherein housing 14", which is analogous to housing 14 of FIG. 8 and housing 14' of FIG. 12, is curved convexly. When stretched in the counter-recoil direction, housing 14" will be drawn to a more straight cross section before any structural spring rate effect occurs, thereby cushioning the impact of counter-recoil.

While in the embodiment of FIGS. 8, 9 and 10 spring 66 has been shown between the end of cylinder 56 and member 64, it is also contemplated that a suitable spring may be installed within cylinder 56 between piston 60 and the right end wall of the cylinder 60 to accomplish the same purpose as spring 66. In the latter event spring 66 would be eliminated, and the return spring would be located entirely within the cylinder 56.

It can thus be seen that the improved recoil-counter-recoil system of the present invention is manifestly capable of achieving the above-enumerated objects, and while preferred embodiments of the present invention have been disclosed, it will be appreciated that the present invention is not limited thereto but may be otherwise embodied within the scope of the following claims.

What is claimed is:

1. A recoil-counter-recoil system for absorbing energy of a body moving in first and second opposite directions during recoil and counter-recoil, respectively, comprising a base, first energy absorber means mounted relative to said base for absorbing the recoil energy of said body during movement of said body in said first direction toward said base, second energy absorber means mounted on said base, coupling means for coupling said second energy absorber means to said body when said body moves in said second direction, said second energy absorber means comprising an elongated resilient member stretchable in said second direction for absorbing the energy of counter-recoil of said body as a result of being stretched by movement of said body in said second direction.

2. A recoil-counter-recoil system as set forth in claim 1 wherein said second energy absorber means comprises a housing for containing a portion of said first energy absorber means, and means for permitting relative linear movement between said first energy absorber means and said housing when said body moves in said first direction.

3. A recoil-counter-recoil system as set forth in claim 2 wherein said first energy absorber means comprises a liquid energy absorber.

4. A recoil-counter-recoil system as set forth in claim 2 wherein said second energy absorber means comprises a plurality of housings having different energy absorbing capacities.

5. A recoil-counter-recoil system as set forth in claim 2 wherein said housing is formed in a curved shape to provide a combined structural spring rate and energy absorbing capacity.

6. A recoil-counter-recoil system as set forth in claim 2 wherein said first energy absorber means and said housing are substantially coaxial.

7. A recoil-counter-recoil system as set forth in claim 2 wherein said energy absorber means comprise a plurality of housings which are stretched in sequence and cumulatively.

8. A recoil-counter-recoil system as set forth in claim 2 including means mounted on said base member for moving said body in said second direction.

9. A recoil-counter-recoil system as set forth in claim 8 including housing means for guiding the movement of said body in said first and second directions.

10. An energy absorber for absorbing energy comprising a cylinder for containing hydraulic fluid, a piston in said cylinder, a base member, a piston rod mounted on said base member and having first and second end portions, means mounting said first end portion on said base member, means mounting said piston on said second end portion, an end closure on said cylinder between said first and second end portions, a first surface on said end closure facing said base member, a second surface on said end closure facing said piston, means mounting said end closure for movement relative to said cylinder in a direction axially of said piston rod, a third surface on said cylinder between said piston and said end closure, energy absorbing bottoming stop means comprising means for engaging said first surface to cause said end closure to travel toward said piston, and yieldable means in said cylinder for being engaged between said second surface and said third surface for absorbing bottoming impact.

11. An energy absorber as set forth in claim 10 wherein said yieldable means comprises an annular channel member having spaced flanges encircling said piston rod.

12. An energy absorber as set forth in claim 11 wherein there is a first slidable fit between said annular channel member and said piston rod and a second slidable fit between the inside of said cylinder and said annular channel member whereby said annular channel also functions as a guidance member.

13. An energy absorber as set forth in claim 12 including an accumulator member mounted on said annular channel between said spaced flanges.

14. An energy absorber as set forth in claim 10 including spring means interposed between said base member and said cylinder proximate said first end portion of said piston rod for biasing said cylinder away from said base member.

15. An energy absorber as set forth in claim 14 including a housing for containing said cylinder, means mounting said housing on said base member, and interengaging means between said housing and said cylinder for causing said cylinder to place said housing in tension in response to the movement of said cylinder away from said base member.

16. An energy absorber for absorbing energy comprising a cylinder for containing hydraulic fluid, a piston in said cylinder, a piston rod having first and second end portions, means mounting said piston on said first end portion, an end closure between said first and second end portions, means mounting said end closure on said cylinder for movement axially of said piston rod, and energy absorbing bottoming means in said cylinder in abutting relationship to said end closure.

17. An energy absorber as set forth in claim 16 wherein said end closure includes a first surface facing said piston, a second surface on said cylinder facing said first surface and spaced therefrom, and wherein said energy absorbing bottoming means includes a third surface in engagement with said first surface and also includes a fourth surface in engagement with said second surface.

18. An energy absorber as set forth in claim 17 wherein said energy absorbing bottoming stop means comprises an annular channel member having spaced flanges encircling said piston rod.

19. An energy absorber as set forth in claim 18 wherein there is a first slidable fit between said annular channel member and said piston rod and a second slidable fit between the inside of said cylinder and said annular channel member whereby said annular channel also functions as a guidance member.

20. An energy absorber as set forth in claim 19 including an accumulator member mounted on said annular channel between said spaced flanges.

21. An energy absorber as set forth in claim 19 wherein said spaced flanges comprise said third and fourth surfaces.

22. An energy absorber as set forth in claim 16 including spring means for biasing said piston toward said end closure.

23. An energy absorber comprising a cylinder, hydraulic fluid within said cylinder, a piston in said cylinder, a piston rod having first and second end portions, means mounting said piston on said first end portion, an end closure on said cylinder between said first and second end portions, yieldable bottoming means within said cylinder and spaced from said piston, a first surface on said end closure facing said piston, a second surface on said yieldable bottoming means facing said first surface, a third surface on said yieldable bottoming means facing said piston, and a fourth surface within said cylinder for abutting said third surface to cause said yieldable bottoming means to be clamped between said first and fourth surfaces for absorbing energy.

24. An energy absorber as set forth in claim 23 including spring means for biasing said piston away from said end closure.

25. A recoil-counter-recoil system as set forth in claim 6 wherein said housing is cylindrical and wherein said coupling means comprises interengaging shoulders between said first energy absorber means and said housing.

* * * * *